(12) United States Patent
Schimkat et al.

(10) Patent No.: US 7,022,168 B2
(45) Date of Patent: Apr. 4, 2006

(54) DEVICE FOR REMOVING CARBON DIOXIDE FROM EXHAUST GAS

(75) Inventors: Armin Schimkat, Hirschberg (DE); Juergen Baum, Mannheim (DE)

(73) Assignee: Alstom Technology LTD, Baden (CH)

( * ) Notice: Subject to any disclaimer, the term of this patent is extended or adjusted under 35 U.S.C. 154(b) by 163 days.

(21) Appl. No.: 10/410,296

(22) Filed: Apr. 10, 2003

(65) Prior Publication Data
US 2003/0209142 A1    Nov. 13, 2003

Related U.S. Application Data

(62) Division of application No. 09/820,680, filed on Mar. 30, 2001, now Pat. No. 6,596,248.

(30) Foreign Application Priority Data
Mar. 31, 2000    (DE) .................... 100 16 079

(51) Int. Cl.
*F02C 6/18* (2006.01)
*B01D 53/06* (2006.01)
*B01D 53/62* (2006.01)
*F01K 23/10* (2006.01)
*F23J 15/00* (2006.01)

(52) U.S. Cl. .............. 96/125; 60/39.5; 60/39.12; 60/648; 60/649; 95/113; 95/114; 95/139; 95/148; 96/126; 96/130; 423/220; 423/230

(58) Field of Classification Search ........... 60/39.12, 60/39.5, 39.511, 648, 649, 39.512; 95/113, 95/114, 139, 148; 423/245.1, 220, 230; 96/125, 96/126, 130
See application file for complete search history.

(56) References Cited

U.S. PATENT DOCUMENTS

| | | | |
|---|---|---|---|
| 3,865,924 A | 2/1975 | Gidaspow et al. |
| 4,126,000 A | 11/1978 | Funk |
| 4,513,573 A | 4/1985 | Funk |
| 4,778,492 A | 10/1988 | Dawson |
| 5,339,633 A | 8/1994 | Fujii et al. |
| 5,344,627 A | 9/1994 | Fujii et al. |
| 5,464,468 A | 11/1995 | Tanaka et al. |
| 5,520,894 A | 5/1996 | Heesink et al. |
| 5,665,319 A | 9/1997 | Hirama et al. |

(Continued)

FOREIGN PATENT DOCUMENTS

DE    197 28 151    1/1999

(Continued)

*Primary Examiner*—Stanley S. Silverman
*Assistant Examiner*—Ardith E. Hertzog
(74) *Attorney, Agent, or Firm*—Buchanan Ingersoll PC

(57) ABSTRACT

In a method for removing carbon dioxide from the exhaust gas from a gas turbine plant (11), which exhaust gas is subjected to a downstream heat recovery process (12, 33), preferably in the heat recovery steam generator (33) of a water/steam cycle (12), a simplification of the plant engineering is achieved by the fact that the carbon dioxide is removed from the exhaust gas (39) between the gas turbine plant (11) and the heat recovery process (12, 33), and that a rotating, regenerative absorber/desorber (22) is used to remove the carbon dioxide, the absorber side of which absorber/desorber is connected into the exhaust gas stream (39) and the desorber side of which absorber/desorber is connected into a carbon dioxide cycle (38).

15 Claims, 2 Drawing Sheets

U.S. PATENT DOCUMENTS

| | | | |
|---|---|---|---|
| 5,724,805 A | | 3/1998 | Golomb et al. |
| 5,832,712 A | | 11/1998 | Ronning et al. |
| 5,937,652 A | | 8/1999 | Abdelmalek |
| 6,148,602 A | | 11/2000 | Demetri |
| 6,389,814 B1 | * | 5/2002 | Viteri et al. .................. 60/716 |
| 2001/0015061 A1 | | 8/2001 | Viteri et al. |
| 2001/0037728 A1 | * | 11/2001 | Schimkat et al. ............. 95/113 |
| 2003/0209142 A1 | * | 11/2003 | Schimkat et al. ............. 95/113 |

FOREIGN PATENT DOCUMENTS

| | | |
|---|---|---|
| EP | 0 444 987 | 8/1993 |
| EP | 0 993 855 | 4/2000 |
| EP | 0 993 856 | 4/2000 |
| JP | 06080401 | 3/1994 |
| JP | 09099214 | 4/1997 |
| JP | 11090219 | 4/1999 |
| JP | 00005559 | 1/2000 |

* cited by examiner

12
DEVICE FOR REMOVING CARBON DIOXIDE FROM EXHAUST GAS

RELATED APPLICATION DATA

This application is a divisional of application Ser. No. 09/820,680 filed on Mar. 30, 2001, now U.S. Pat. No. 6,596,248, and claims priority under 35 U.S.C. §§ 119 and/or 365 to German Application No. 100 16 079.4 filed on Mar. 31, 2000.

The present invention relates to the fields of power plant engineering, which include the operation of a gas turbine, for example combined cycle power plants. It relates to a method and a device for removing carbon dioxide from the exhaust gas from a gas turbine plant which has a downstream heat recovery process.

BACKGROUND OF THE INVENTION

A method of this type and a device of this type are known, for example, from document U.S. Pat. No. 5,832,712.

During the increasing discussion of possible climate changes caused by the increase of the carbon dioxide concentration in the Earth's atmosphere ("greenhouse effect"), which is attributable primarily to the burning of fossil fuels, such as natural gas, mineral oil and coal, there is an increasing range of proposals being put forward as to how, for example in fossil-fired power plants, the carbon dioxide can be removed from the flue gases of the boiler or exhaust gases from gas turbine plants on an industrial scale before it is released into the atmosphere.

One of these proposals is described in U.S. Pat. No. 5,344,627. In this proposal, the flue gas from the fossil-fired boiler of a steam power plant is brought into contact, in countercurrent, with a liquid which absorbs carbon dioxide and contains, for example, an alkanolamine. The carbon dioxide which is absorbed by the liquid is removed from the liquid again at a different point in the liquid cycle and is then liquefied. The liquid cycle together with the necessary absorption and regeneration columns requires a substantial outlay on plant engineering.

Another proposal, which is known from U.S. Pat. No. 5,665,319, for removing carbon dioxide from a gas which contains carbon dioxide uses, instead of a liquid, a granular metal oxide, which is converted into a metal carbonate by absorbing carbon dioxide and is converted back into the metal oxide by subsequent removal of the carbon dioxide. The granular powder is either conveyed back and forth in a cycle between a fixation tower and a decomposition furnace, or two similar devices with a solid powder bed are used alternately to absorb and release the carbon dioxide by switching between the devices. A drawback of this method is that the device in which the carbon dioxide is released again must in each case be operated as an externally heated furnace.

Finally, in the document U.S. Pat. No. 5,832,712 which is mentioned in the introduction, it is proposed to remove the carbon dioxide from the exhaust gas from a gas turbine plant by bringing the exhaust gas, after it has passed through a heat recovery steam generator, into contact with a liquid which absorbs carbon dioxide in an absorption column. In this case too, there is the drawback of the outlay on plant engineering for the liquid cycle of the absorbing liquid.

SUMMARY OF THE INVENTION

Therefore, it is an object of the invention to provide a method and a device which allow simple removal of carbon dioxide from the exhaust gas from a gas turbine plant, the exhaust gas then being subjected to a heat recovery process.

Carbon dioxide is removed at a high temperature level before the heat recovery process and by the use of a rotating, regenerative absorber/desorber, which is equipped with an absorbent coating, for the removal, which absorber/desorber operates between the exhaust gas stream and a separate carbon dioxide cycle.

A first preferred configuration of the method according to the invention is characterized in that heat is transferred from the exhaust gas to the carbon dioxide cycle between the gas turbine plant and the absorber/desorber. In this way, a temperature level which is higher than on the absorption side and is required in order to release the absorbed carbon dioxide in the absorber/desorber is achieved in a simple manner in the carbon dioxide cycle.

The temperature difference between the absorption and desorption sides of the absorber/desorber can be further increased if, according to another refinement of the method, the heat recovery process comprises a water/steam cycle with a heat recovery steam generator, and the exhaust gas, following the heat transfer to the carbon dioxide cycle and prior to entry into the absorber/desorber, is used to superheat steam in the water/steam cycle.

If the temperature of the exhaust gas on emerging from the gas turbine of the gas turbine plant is not sufficient to heat the carbon dioxide cycle, it is expedient to additionally heat the exhaust gas prior to the heat transfer to the carbon dioxide cycle.

Finally, a part stream which corresponds to the carbon dioxide which has been removed from the exhaust gas is branched off from the carbon dioxide cycle and is then cooled.

A preferred configuration of the device according to the invention is distinguished by the fact that a first heat exchanger, which is in communication with the carbon dioxide cycle, is arranged between the gas turbine plant and the absorber/desorber, by the fact that the heat recovery means comprise a water/steam cycle with a heat recovery steam generator, and by the fact that a second heat exchanger for superheating the steam in the water/steam cycle is arranged between the first heat exchanger and the absorber/desorber.

The absorber/desorber is preferably constructed in the manner of a coated regenerative heat exchanger and is equipped with a large reactive surface for the absorption and desorption of carbon dioxide, the core material which bears the coating or an intermediate layer which is arranged between the reactive coating of the absorber/desorber and the core material having a low thermal conductivity in order to reduce the heat transfer between the carbon dioxide cycle and the absorption side.

BRIEF DESCRIPTION OF THE DRAWINGS

Preferred embodiments of the invention are disclosed in the following description and illustrated in the accompanying drawings, in which.

DETAILED DESCRIPTION OF PREFERRED EMBODIMENTS

Figure 1:
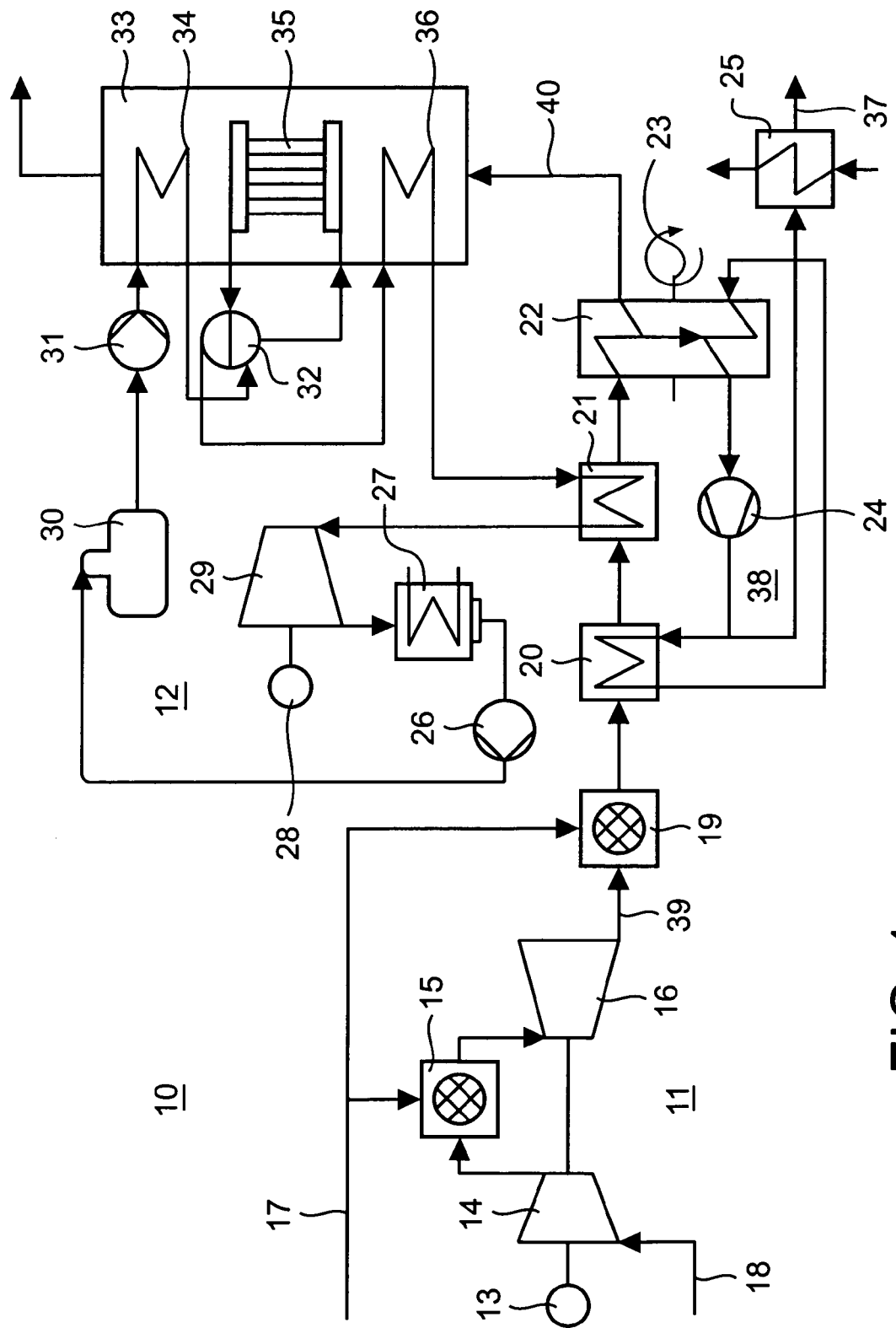
FIG. 1 shows the diagram of a preferred exemplary embodiment for a device according to the invention in the form of a combined cycle power plant.

FIG. 1 illustrates the plant diagram of a combined cycle power plant 10 with a device for removing carbon dioxide from the exhaust gas. The combined cycle power plant 10 substantially comprises three plant parts, namely a gas turbine plant 11, a water/steam cycle 12 and a carbon dioxide cycle 38, all of which are coupled to one another.

The gas turbine plant 11 comprises a compressor 14, a first combustion chamber 15 and a gas turbine 16. Via an air inlet 18, the compressor sucks in combustion air and compresses it. The compressed air is used for combustion of a (liquid or gaseous) fuel in the first combustion chamber 15. The hot gas which is formed during the combustion is expanded in the gas turbine 16, which via a common rotor drives the compressor 14 and generates current via a connected first generator 13. The exhaust gas 39 from the gas turbine 15, after it has passed through a plurality of intermediate stages (19, 20, 21, 22), which will be dealt with in more detail below, is fed through a heat recovery steam generator (HRSG) 33 which lies in the water/steam cycle 12 and where heat is recovered from the exhaust gas 40 and is used to generate steam. Within the-scope of the invention, however, it is also possible to provide a different heat recovery process instead of the heat recovery steam generator 33 or the water/steam cycle 12.

In the heat recovery steam generator 33, feed water, which is pumped in from a feed-water tank/deaerator 30 by means of a feed-water pump 31, is preheated in an economizer 34, then is evaporated in an evaporator 35 which is connected to a steam drum 32 and is then superheated in a superheater 36. The live steam is expanded in a steam turbine 29, is condensed in a downstream condenser 27 and is pumped back into the feed-water tank/deaerator 30 by means of a condensate pump 26. The steam turbine 29, which usually comprises a plurality of pressure stages, drives a second generator 28, but may also be coupled to the gas turbine 16.

The exhaust gas 39 emerging from the gas turbine 16 contains carbon dioxide, which is removed from the exhaust gas with the aid of the plant parts 19–25 and 37, 38 and is processed further separately. The carbon dioxide cycle 38 is at a significantly higher temperature than the exhaust gas 40 flowing to the heat recovery steam generator 33. After it has left the gas turbine 16, the exhaust gas 39 is firstly heated in a second combustion chamber 19 (which is an additional means for heating the exhaust gas 39 from the gas turbine 16) which, in the same way as the first combustion chamber 15, is supplied with fuel via a fuel inlet 17. The associated temperature rise, in a downstream first heat exchanger 20, allows sufficient heat to be transferred from the exhaust gas 39 to the carbon dioxide cycle 38. At this point, it should be noted that in future generations of gas turbines in which the outlet temperatures are even higher, it may be possible to dispense with the second combustion chamber 19.

Figure 2:
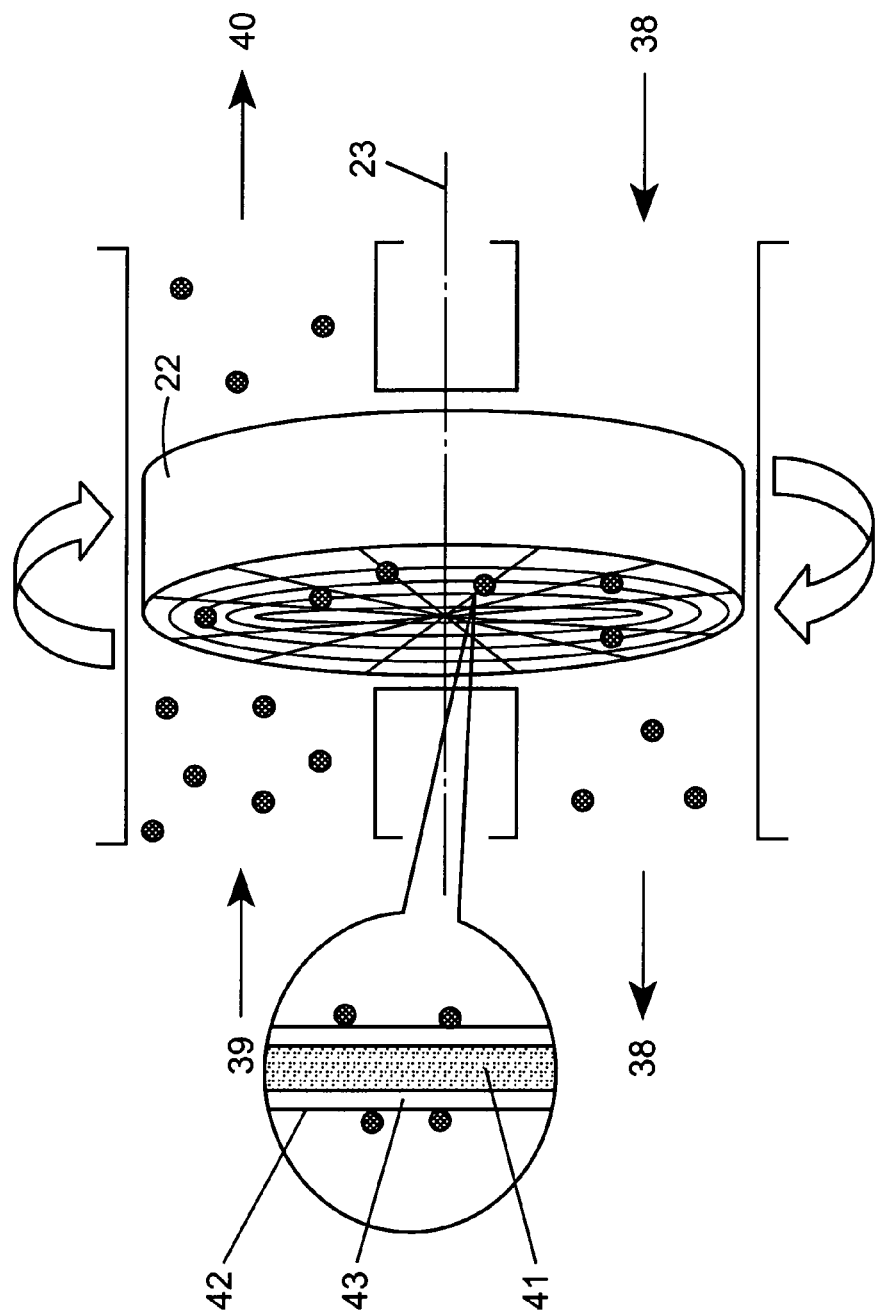
FIG. 2 illustrates a detail of the absorber/desorber.

As shown in detail in FIG. 2, before the exhaust gas 39, for removal of the carbon dioxide, enters a regenerative absorber/desorber 22 which rotates about an axis of rotation 23, the exhaust gas 39 is cooled further in a second heat exchanger 21, which serves to further superheat the steam in the water/steam cycle 12. In the rotating absorber/desorber 22, the carbon dioxide contained in the exhaust gas 39 is absorbed on a reactive absorber surface 42 at a lower temperature, then rotates, about the axis of rotation 23, toward the side of the carbon dioxide cycle 38, where it is desorbed at the elevated temperatures. However, not only is carbon dioxide conveyed from the exhaust gas stream 39 into the carbon dioxide cycle 38 by the rotating components of the absorber/desorber 22, but conversely heat is also conveyed from the carbon dioxide cycle 38 into the exhaust gas stream 40. This undesirable heat transfer can be limited either by an intermediate layer 43 of low thermal conductivity being arranged between the reactive surface coating 42 and the core material (rotor) 41 which bears this coating or by the core material 41 itself having a thermally insulating action.

While the exhaust gas 40 with a low carbon dioxide content, on leaving the absorber/desorber 22, is passed onward to the heat recovery steam generator 33 in order for the heat to be recovered, a part stream, which corresponds to the carbon dioxide which is removed from the exhaust gas 39 per unit time, is branched off from the carbon dioxide which is being circulated in the carbon dioxide cycle 38 by means of a blower 24, and after cooling in a further heat exchanger 25 is removed for further use via a carbon dioxide outlet 37. The circulating carbon dioxide is heated in the first heat exchanger 20, in order to keep the desorption in progress in the absorber/desorber 22.

The absorber/desorber 22 is preferably designed in the manner of a coated regenerative heat exchanger. Its essential elements are a core structure 41 which rotates about an axis of rotation 23 and is coated with a reactive material 42, which has a large surface area, for the absorption and desorption of carbon dioxide and, if appropriate, a thermally insulating intermediate layer 43. Devices of this type are known per se (cf. for example the documents U.S. Pat. No. 3,865,924 or U.S. Pat. No. 5,464,468 or U.S. Pat. No. 4,778,492).

The invention claimed is:

1. A device for removing carbon dioxide from a carbon dioxide-containing exhaust gas stream exhausted from a gas turbine plant, the device comprising a gas turbine plant and downstream means for recovering heat from the exhaust gas stream exhausted from the gas turbine plant, wherein a rotating, regenerative absorber/desorber adapted to remove carbon dioxide from the exhaust gas stream is arranged between the gas turbine plant and the heat recovery means, the absorber side of the absorber/desorber is connected to receive the exhaust gas stream and the desorber side of the absorber/desorber at which carbon dioxide is desorbed is connected into a carbon dioxide cycle in which carbon dioxide is circulated.

2. The device as claimed in claim 1, wherein a first heat exchanger is arranged between the gas turbine plant and the absorber/desorber to heat the carbon dioxide stream circulated in the carbon dioxide cycle.

3. The device as claimed in claim 2, wherein the heat recovery means comprises a water/steam cycle with a heat recovery steam generator, and wherein a second heat exchanger for superheating the steam in the water/steam cycle is arranged between the first heat exchanger and the absorber/desorber.

4. The device as claimed in claim 2, wherein an additional means for heating the exhaust gas stream from the gas turbine plant is arranged upstream of the first heat exchanger.

5. The device as claimed in claim 6, wherein a carbon dioxide outlet branches off from the carbon dioxide which is circulated in the carbon dioxide cycle, and wherein a heat exchanger for cooling the carbon dioxide which has been branched off is arranged in the carbon dioxide outlet.

6. The device as claimed in claim 1, wherein the absorber/desorber is constructed in the manner of a coated regenerative heat exchanger and is equipped with a large reactive surface for the absorption and desorption of carbon dioxide.

7. The device as claimed in claim 6, wherein an intermediate layer of low thermal conductivity is arranged between the reactive coating and the core material which bears the reactive coating.

8. A device for removing carbon dioxide from a carbon dioxide-containing exhaust gas stream exhausted from a gas turbine plant, the device comprising:
   a gas turbine plant;
   a heat recovery part downstream from the gas turbine plant, the heat recovery part being adapted to recover heat from the exhaust gas stream exhausted from the gas turbine plant; and
   a rotating, regenerative absorber/desorber arranged between the gas turbine plant and the heat recovery part, the absorber/desorber being adapted to remove carbon dioxide from the exhaust gas stream and including an absorber side connected to receive the exhaust gas stream and a desorber side at which carbon dioxide is desorbed is connected into a carbon dioxide cycle in which carbon dioxide is circulated.

9. The device as claimed in claim 8, comprising a first heat exchanger arranged between the gas turbine plant and the absorber/desorber to heat the carbon dioxide stream circulated in the carbon dioxide cycle.

10. The device as claimed in claim 9, wherein the heat recovery part comprises a water/steam cycle with a heat recovery steam generator.

11. The device as claimed in claim 9, wherein a second heat exchanger for superheating the steam in the water/steam cycle is arranged between the first heat exchanger and the absorber/desorber.

12. The device as claimed in claim 9, comprising a combustion chamber for heating the exhaust gas stream from the gas turbine plant arranged upstream of the first heat exchanger.

13. The device as claimed in claim 8, comprising:
   a carbon dioxide outlet which branches off from the carbon dioxide which is circulated in the carbon dioxide cycle; and
   a heat exchanger for cooling the carbon dioxide which has been branched off arranged in the carbon dioxide outlet.

14. The device as claimed in claim 8, wherein the absorber/desorber comprises a coated regenerative heat exchanger which includes a reactive surface for the absorption and desorption of carbon dioxide.

15. The device as claimed in claim 14, comprising an intermediate layer of low thermal conductivity arranged between the reactive coating and the core material which bears the reactive coating.

* * * * *